United States Patent
Nakajima et al.

Patent Number: 5,411,779
Date of Patent: May 2, 1995

[54] COMPOSITE TUBULAR ARTICLE AND PROCESS FOR PRODUCING THE SAME

[75] Inventors: Toshio Nakajima; Masayuki Kaneto; Toshihiko Tomita; Tokio Fujita; Hitoshi Ishizaka; Chiaki Harada; Gosei Uemura; Taizo Sasaki; Masao Nakamura; Mamoru Hondo; Tadanori Michimoto; Toshiaki Iwamoto, all of Osaka, Japan

[73] Assignee: Nitto Denko Corporation, Osaka, Japan

[21] Appl. No.: 877,578

[22] PCT Filed: Jul. 20, 1990

[86] PCT No.: PCT/JP90/00941
§ 371 Date: Mar. 21, 1991
§ 102(e) Date: Mar. 21, 1991

[87] PCT Pub. No.: WO91/01220
PCT Pub. Date: Feb. 7, 1991

[30] Foreign Application Priority Data

Jul. 21, 1989 [JP] Japan ................................ 1-190038
Jul. 17, 1990 [JP] Japan ................................ 2-189139

[51] Int. Cl.⁶ .......................... B32B 7/02; B32B 27/00
[52] U.S. Cl. .................................... 428/36.91; 428/174; 428/421; 428/473.5; 428/36.4; 138/140; 138/145; 138/DIG. 13; 264/308; 264/299; 264/130; 29/895.3; 492/56; 492/59
[58] Field of Search .................. 428/36.9, 36.91, 174, 428/421, 473.5, 34.5, 36.4, 212, 220, 232, 339, 402, 903, 141, 147, 148, 323, 422, 409; 138/140, 145, DIG. 13; 264/308, 299, 112, 113, 129-131; 427/230, 233, 236, 237, 402; 29/895.3; 492/56, 59

[56] References Cited

U.S. PATENT DOCUMENTS

3,933,825 11/1976 Buchan et al. .................... 428/421
4,482,603 11/1984 Yoshida et al. ................... 428/287

(List continued on next page.)

FOREIGN PATENT DOCUMENTS

0283604 9/1988 European Pat. Off. .

(List continued on next page.)

OTHER PUBLICATIONS

Patent Abstracts of Japan, vol. 11, No. 35 (P-542) (2482) 3 Feb. 1987 & JP-A-61 203 460 (Daicel Chem. Ind. Ltd.) 9 Sep. 1986 "abstract".

(List continued on next page.)

*Primary Examiner*—Charles R. Nold
*Attorney, Agent, or Firm*—Sughrue, Mion, Zinn, Macpeak & Seas

[57] ABSTRACT

The present invention relates to a composite tubular article for use as the fixing belt in an image-forming device such as a copying machine etc., particularly as a fixing belt suited for thermal fixing, and also relates to a process for producing the same.

Conventionally known as an image-fixing belt is a belt consisting of a polyimide resin as the inner layer and a fluoroplastic as the outer layer. However, this fixing belt has problems that clear images cannot be obtained because the thickness of each layer is uneven, and that unglossed, so-called matt images cannot be obtained because the belt surface is smooth.

This invention provides a composite tubular article comprising a tubular inner layer made of a polyimide resin and a tubular outer layer made of a fluoroplastic, the outer circumferential surface of the fluoroplastic tubular outer layer having a surface roughness of 1 to 10 μm. The invention further provides, as a production process for the same, a process in which the outer layer is formed by use of a cylinder having an inner circumferential surface with a surface roughness of 1 to 10 μm, and a polyimide-resin tubular inner layer is formed on the inner circumferential surface of the outer layer by converting a poly(amic acid) into a polyimide, or a process in which an inner layer formed by converting a poly(amic acid) into a polyimide is immersed in or sprayed with a fluoroplastic solution in which a particulate material of 5 μm or smaller has been dispersed, thereby to form an outer layer.

13 Claims, 3 Drawing Sheets

U.S. PATENT DOCUMENTS

| | | | |
|---|---|---|---|
| 4,505,573 | 3/1985 | Brewington et al. | 355/3 DD |
| 5,011,727 | 4/1991 | Kido et al. | 427/421 |

FOREIGN PATENT DOCUMENTS

| | | | |
|---|---|---|---|
| 0286543 | 10/1988 | European Pat. Off. | |
| 0293482 | 12/1988 | European Pat. Off. | |
| 0338479 | 10/1989 | European Pat. Off. | |
| 2049978 | 4/1971 | Germany | |
| 3008776 | 6/1986 | Japan | B05C 1/02 |
| 03033784 | 6/1989 | Japan | B32B 27/30 |

OTHER PUBLICATIONS

Patent Abstracts of Japan, vol. 14, No. 267 (P-1058) (4210) 8 Jun. 1990 & JP-A-2 074 944 (Brother Ind. Inc.) 14 Mar. 1990 "abstract".

Patent Abstracts of Japan, vol. 12, No. 473 P-799) (3320) 12 Dec. 1988 &JP-A-63 192 069 (Minolta Camera Co. Ltd.) 9 Aug. 1988 "abstract".

Patent Abstracts of Japan, vol. 4, No. 155 (C-29) (637) 29 Oct. 1980 & JP-A-55 099 031 (Nitto Denki Kogyo K.K.) 30 Jul. 1980 "abstract".

COMPOSITE TUBULAR ARTICLE AND PROCESS FOR PRODUCING THE SAME

TECHNICAL FIELD

The present invention relates to a composite tubular article for use as the fixing belt in an image-forming device such as a copying machine, facsimile, or printer, and also relates to a process for producing the composite tubular article.

BACKGROUND ART

Conventionally, as methods for fixing images to transfer paper or the like in the above-mentioned image-forming devices, fixing techniques employing heat, pressure, or a combination of both have been proposed. Examples thereof include the oven fixing method, flash fixing method, pressure fixing method, hot roller fixing method, and the like. Of these, the hot roller fixing method is extensively employed from the standpoints of thermal efficiency, the danger of taking fire, fixing properties, etc.

Figure 4:
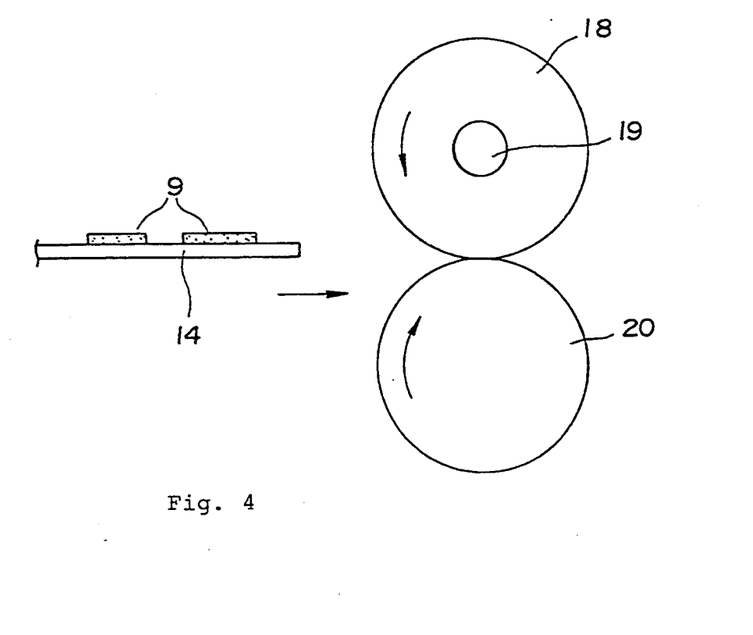
FIGS. 4 and 5 each is a diagrammatic view of the fixing mechanism part of a conventional image-forming device.
Figure 5:
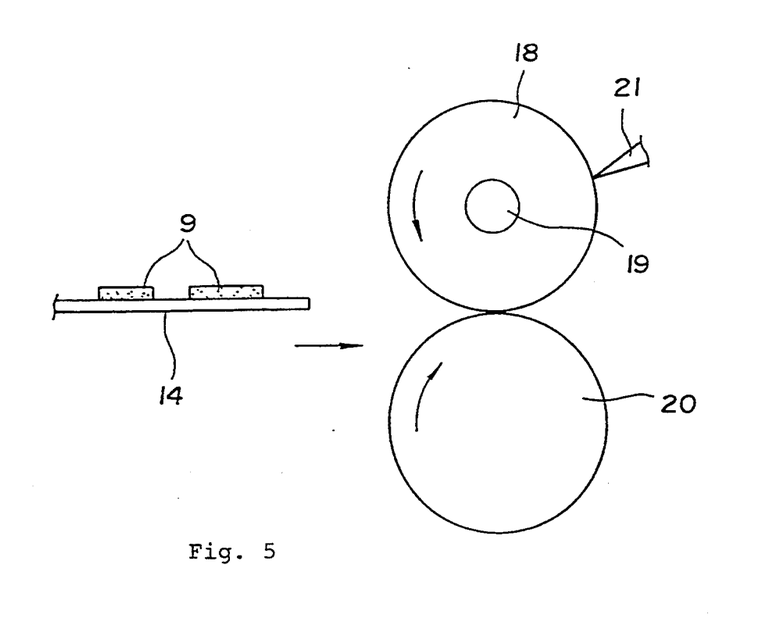

As shown in FIG. 4, the above hot roller fixing method is a technique in which a hot roller 18 and a press roller 20 are arranged in a vertical stack and a transfer paper 14 is passed between the rollers 18 and 20. In this technique, a heat-sensitive ink 9 as a substance to be fixed is fused and fixed to the transfer paper 14 by heating the ink with a built-in fixing heater 19 in the hot roller 18 and, at the same time, fixing of the ink is made tenacious by pressing the ink with the press roller 20, thereby making an image by the heat-sensitive ink 9 on the transfer paper 14. In this case, for the purpose of preventing the heat-sensitive ink 9 or the transfer paper 14 to which the ink has been fixed from adhering to the hot roller 18 after the fixing, coating of a fluorine compound on the surface of the hot roller 18 or coating of a silicone oil on the surface of the above coating layer is being conducted. Further, since the above treatments only is insufficient in preventing the adhesion of the heat-sensitive ink 9 or transfer paper 14 to the hot roller 18, a separating blade 21 is provided, in addition to the above treatment, in such a manner that the blade is in slightly contact with the surface of the hot roller 18 as shown in FIG. 5, to thereby prevent the heat-sensitive ink 9 or the transfer paper 14 to which the ink has been fixed from adhering to the hot roller 18. However, provision of the separating blade 21 in an image-forming device as described above makes the device expensive and also causes a problem that the complicated device mechanism leads to frequent occurrence of troubles.

On the other hand, in order to fix the heat-sensitive ink 9 to the transfer paper 14, the hot roller 18 should be heated to a temperature required for the fixing. However, if the temperature of the hot roller 18 is raised too high, there are cases where the heat-sensitive ink 9 cannot be completely peeled from the hot roller 18 because the heat-sensitive ink 9 itself has a slightly tacky nature. As a result, not only the quality of the image formed on the transfer paper 14 becomes insufficient, but the resistance at the time of peeling from the hot roller 18 causes problems that the transfer paper 14 is electrostatically charged due to the peeling, resulting in adhesion of dust particles to the charged transfer paper 14, and that the hot roller 18 and the separating blade 19 are electrostatically charged with static electricity.

In order to solve the problems as described above, a system is being studied in which a peeling roller (not shown), for example, is used as the third roller in addition to the hot roller 18 and the press roller 20, with the peeling roller being provided on a side of the hot roller 18, and a fixing belt made of a flexible composite tubular article comprising a fluoroplastic and a polyimide resin is stretched between the hot roller 18 and the peeling roller, and in which the transfer paper 14 printed with the heat-sensitive ink 9 is passed between the belt and the press roller 20. The fluoroplastic employed in the above fixing belt is excellent in release properties, chemical resistance, and heat resistance, and has conventionally been used in large quantities for release agents, sealing materials, and the like. The above-mentioned polyimide resin is excellent in heat resistance, chemical resistance, electrical insulating properties, mechanical properties, etc. Therefore, the objective of the adoption of the fixing belt made of such a composite tubular article is to simply and effectively attain improved transfer and release properties etc. by employing a fluoroplastic layer, having excellent heat resistance and release properties, as the outer layer and a polyimide resin layer, having excellent heat resistance, electrical insulating properties, and mechanical properties, as the inner layer in the fixing belt. A process for producing such a composite tubular article is described in JP-A-61-95361. (The term "JP-A" used herein means an unexamined published Japanese patent application.) In this production process, a solution of a precursor of polyimide resin is mixed with an electrically conductive fine powder to prepare a liquid mixture, and this mixture is placed in a large-diameter cylindrical vessel and subjected to centrifugal casting with heating, thereby to form a thin layer along the inner circumferential surface of the cylinder. An endless belt (having an electrically conductive layer) made of this thin layer is then formed, and on the surface of the electrically conductive layer of the belt, a fluoroplastic is spray-coated to form a dielectric layer, thereby preparing a photo-insensitive dielectric belt.

PROBLEMS TO BE SOLVED BY THE INVENTION

However, the spray coating of a fluoroplastic dispersion alone on the outer surface of the polyimide resin layer having electrical conductivity, as in the above process, is prone to result in unevenness of coating.

Therefore, each layer has uneven thickness, and if such a belt is used as a fixing belt, clear images are less apt to be obtained.

In general, there are two types of images, glossed images and unglossed images (matt images). In order to obtain high-quality matt images by using a copying machine or the like, the fixing belt should have a uniformly roughened outer circumferential surface.

However, the spray coating of a fluoroplastic dispersion alone as in the above-described process is not preferable in that the resulting fluoroplastic layer has a smooth outer surface, thereby giving glossy images.

DISCLOSURE OF THE INVENTION

The present invention has been accomplished in view of the above circumstances. An object of the present invention is to provide a composite tubular article which has a uniformly roughened outer circumferential surface and, when used as a fixing belt, can give high-quality matt images, and to provide a process for producing the composite tubular article.

Intensive studies have been made in order to attain the above objects. As a result, it has been found that a composite tubular article comprising a polyimide tubular inner layer and a fluoroplastic tubular outer layer can be made to exhibit excellent properties as a fixing belt by roughening the outer circumferential surface of the outer layer so as to have a surface roughness in a specific range. The present invention has thus been completed.

That is, the present invention provides, according to the first aspect thereof, a composite tubular article comprising a tubular inner layer made of a polyimide resin and a tubular outer layer made of a fluoroplastic, the outer circumferential surface of the fluoroplastic tubular outer layer having a surface roughness ($R_z$) of 1 to 10 μm. According to the second aspect of the invention, there is provided a process for producing a composite tubular article which comprises coating a fluoroplastic solution on the inner circumferential surface of a cylinder to form a tubular outer layer made of the fluoroplastic, the inner circumferential surface having a surface roughness ($R_z$) of 1 to 10 μm, further coating a poly(amic acid) solution on the inner circumferential surface of the above-formed fluoroplastic tubular outer layer, causing a bullet-shaped or spherical runner to run along the inner circumferential surface on which the poly(amic acid) solution has been coated, subsequently imidizing the poly(amic acid) to form a tubular inner layer made of a polyimide resin, thereby to obtain a composite tubular article, and then taking the composite tubular article out of the cylinder. According to the third aspect of the invention, there is provided a process for producing a composite tubular article which comprises coating a poly(amic acid) solution on the inner circumferential surface of a cylinder, causing a bullet-shaped or spherical runner to run along the inner circumferential surface on which the poly(amic acid) solution has been coated, subsequently imidizing the poly(amic acid) solution to form a tubular inner layer made of a polyimide resin, thereafter taking the polyimide-resin tubular inner layer out of the cylinder, and then immersing the tubular inner layer in a fluoroplastic solution in which a particulate material having an average particle diameter of 5 μm or less has been uniformly dispersed, thereby to form a tubular outer layer made of the fluoroplastic on the outer circumferential surface of the polyimide-resin tubular inner layer. According to the fourth aspect of the invention, there is provided a process for producing a composite tubular article which comprises coating a poly(amic acid) solution on the inner circumferential surface of a cylinder, causing a bullet-shaped or spherical runner to run along the inner circumferential surface on which the poly(amic acid) solution has been coated, subsequently imidizing the poly(amic acid) to form a tubular inner layer made of a polyimide resin, thereafter taking the polyimide-resin tubular inner layer out of the cylinder, and then spray-coating the outer circumferential surface of the tubular inner layer with a fluoroplastic solution in which a particulate material having an average particle diameter of 5 μm or less has been uniformly dispersed, thereby to form a tubular outer layer made of the fluoroplastic.

In this invention, the composite tubular article is produced by use of a fluoroplastic and a poly(amic acid) as a precursor for polyimide resin.

The fluoroplastic is used in the form of a solution (including dispersion). Examples of the fluoroplastic include commercially available polytetrafluoroethylene resins (PTFE), tetrafluoroethylene/hexafluoropropylene copolymer resins (FEP), tetrafluoroethylene/perfluoroalkyl vinyl ether copolymer resins (PFA), and the like, and these are usually used in a dispersion form. The viscosity of the fluoroplastic solution may be regulated, according to coating thickness and the temperature of the solution, by adding, for example, a surfactant or a thickening agent to the fluoroplastic solution. Generally, the viscosity is regulated at 0.1 to 100 poises (as measured with a B-type viscometer at the temperature at the time of coating operation). The concentration of such a fluoroplastic solution is regulated generally at 5 to 80% by weight (hereinafter abbreviated as "%"), more preferably 20 to 60%.

Use of a fluoroplastic solution containing an electrically conductive substance as the above fluoroplastic solution is preferred because use of the resulting composite tubular article as a fixing belt in, for example, a copying machine or the like is effective. Examples of the electrically conductive substance include electrically conductive powders such as carbon, graphite, and metal powders, and organic compounds and inorganic compounds having electrical conductivity. Of these, use of an electrically conductive powder such as a carbon, graphite, or metal powder is particularly preferred. The content of the electrically conductive substance in the fluoroplastic layer is preferably in the range of from 0.5 to 50%.

As a particulate material that does not have electrical conductivity, use may be made of a particulate material consisting of particles of glass beads, crosslinked silicone resin, ceramic resin, polyimide resin, silicon dioxide, benzoguanamine resin, or the like.

The poly(amic acid) mentioned above is obtained by reacting a tetracarboxylic dianhydride or a derivative thereof with an approximately equimolar amount of a diamine in an organic polar solvent, and is generally used in a solution form.

As the tetracarboxylic dianhydride above, ones represented by the following general formula may be mentioned.

In the formula, R is a tetravalent organic group, which is an aromatic, aliphatic, or cycloaliphatic group, a combination of an aromatic and aliphatic group, or a group formed by substituting any of these groups.

Examples thereof include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis (3,4-dicarboxyphenyl)propanoic dianhydride, bis (3,4-dicarboxyphenyl)sulfonic dianhydride, pirylene-3,4,9,10-tetracarboxylic dianhydride, bis(3,4-dicarboxyphenyl) ether dianhydride, ethylenetetracarboxylic dianhydride, and the like.

Examples of the diamine mentioned above include 4,4'-diaminodiphenyl ether, 4,4'-diaminodiphenylmethane, 3,3'-diaminodiphenylmethane, 3,3'-dichlorobenzidine, 4,4'-aminodiphenyl sulfide-3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminophenylsulfone, 4,4'-diaminodiphenyl sulfide, 4,4'-diaminodiphenylpropane, 2,4-bis($\beta$-amino-t-butyl)toluene, bis(p-$\beta$-amino-t-butylphenyl) ether, bis(p-$\beta$-methyl-$\delta$-aminophenyl)benzene, bis-p-(1,1-dimethyl-5-aminopentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylenediamine, 3-methylhepta-methylenediamine, 4,4-dimethylheptamethylenediamine, 2,11-diaminododecane, 1,2-bis-3-aminopropoxethane, 2,2-dimethylpropylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 2,11-diaminododecane, 2,17-diaminoeicosadecane, 1,4-diaminocyclohexane, 1,10-diamino-1,10-diamino-1,10-dimethyldecane, 1,12-diaminooctadecane, 2,2-bis[4-(4-aminophenoxy)-phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)(CH_2)_3NH_2$, and the like.

The above-mentioned organic polar solvent used for the synthesis of the poly(amic acid) is one in which its functional group has a dipole that does not react with the tetracarboxylic dianhydride or diamine. Further, the organic polar solvent should be inactive to the system and act as a solvent for the poly(amic acid) as the product, and in addition to this, it should act as a solvent for at least one of the reactants, preferably for both. Especially useful as the organic polar solvent are N,N-dialkylamides. Examples thereof include those having low molecular weights, such as N,N-dimethylformamide, N,N-dimethylacetamide, and the like. These can be easily removed from the poly(amic acid) and from shapes of the poly(amic acid) by evaporation, replacement, or diffusion. Other organic polar solvents than the above include N,N-diethylformamide, N,N-diethylacetamide, N,N-dimethylmethoxyacetamide, dimethyl sulfoxide, hexamethylphosphortriamide, N-methyl-2-pyrrolidone, pyridine, dimethyl sulfone, tetramethylenesulfone, dimethyltetramethylenesulfone, and the like. These may be used alone, or may be used in combination. Further, with the organic polar solvents described above, phenols such as cresol, phenol, xylenol, and the like, benzonitrile, dioxane, butyrolactone, xylene, cyclohexane, hexane, benzene, toluene, and the like may be mixed alone or in combination. However, addition of water is not preferred. That is, since the presence of water causes the poly(amic acid) to hydrolyze into low molecular weight compounds, synthesis of the poly(amic acid) is required to be carried out under substantially anhydrous conditions.

By reacting the tetracarboxylic dianhydride (a) with diamine (b) described above in an organic polar solvent, a poly(amic acid) is obtained. The monomer concentration (the concentration of (a)+(b) in the solvent) in the above case is regulated according to various conditions. Normally, however, it is from 5 to 30%. The reaction temperature preferably is regulated at 80° C. or lower, more preferably 5° to 50° C. The reaction time is about 0.5 to 10 hours.

Under such conditions, the acid dianhydride reactant is reacted with the diamine reactant in an organic polar solvent to thereby yield a poly(amic acid), and the viscosity of the solution increases as this reaction proceeds. It is preferable in this invention to synthesize and use a poly(amic acid) having a logarithmic viscosity of 0.5 or more. This is because polyimide tubular articles formed by use of poly(amic acid)s having logarithmic viscosities of 0.5 or more are particularly superior in reliability with respect to heat deterioration to those formed from poly(amic acid)s having lower logarithmic viscosities.

The logarithmic viscosity of the poly(amic acid) is calculated using the following equation from values obtained by measurement of the poly(amic acid) solution with a capillary viscometer.

$$\text{Logarithmic viscosity} = \frac{\ln \frac{t_1}{t_0}}{C}$$

$t_0$: fall time for the solvent, $t_1$: fall time for the solution, C: concentration (g/dl)

If the viscosity of such a poly(amic acid) solution is too high at the time of use, the solution is diluted with a proper solvent to lower the viscosity before it is used. For example, in the case where the poly(amic acid) solution is coated on the inner circumferential surface of a fluoroplastic tubular outer layer formed on the inner circumferential surface of a cylinder, the viscosity of the poly(amic acid) solution is generally regulated at 10 to 10,000 poises (as measured with a B-type viscometer at the temperature at the time of coating operation), although the viscosity regulation depends on coating thickness, inner diameter of the cylinder, solution temperature, runner shape, etc. The concentration of the poly(amic acid) in the poly(amic acid) solution is preferably 5 to 30% from the standpoint of effect, and more preferably 10 to 20%.

According to the present invention, a fluoroplastic dispersion and a solution in an organic polar solvent of a poly(amic acid) obtained as described above are used to produce the composite tubular article comprising a fluoroplastic layer and a polyimide-resin layer by, for example, the following methods. That is, in the first method, the fluoroplastic solution is first coated on the inner circumferential surface of a heat-resistant cylinder (the inner circumferential surface may be coated with a silicone resin etc. for the purpose of obtaining improved release effect) made of a metal, glass, etc. and having an inner circumferential surface roughness of 1 to 10 $\mu$m and an inner diameter of 10 to 500 mm. It is preferable to use a dispersion obtained by uniformly dispersing a particulate material having an average particle diameter of 5 $\mu$m or less into the fluoroplastic solution, because a uniformly roughened outer circumferential surface is obtained. As coating techniques, there may be mentioned (1) a method in which the cylinder is coated by immersing it in the fluoroplastic solution and then drawing it up, (2) a method in which the fluoroplastic solution is fed to around one end of the cylinder and a bullet-shaped or spherical runner is caused to run along the inner circumferential surface of the cylinder, (3) a method in which the fluoroplastic solution is spray-coated on the inner circumferential surface of the cylinder, and other similar methods. According to the situation etc., a proper method is suitably selected. As the bullet-shaped or spherical runner mentioned above, those made of a metal, hard plastics, and hard glass may be mentioned. For causing the runner to run, there may be employed a technique of causing the runner to run by means of the pressure of compressed air, the power of gas explosion, etc., a technique of pulling the runner by means of a traction wire etc., a technique of gravity running (the runner is allowed to run by its own weight with the cylinder being stood on end vertically), and the like. According to need, after the fluoroplastic solution is coated on the inner circumferential surface of the cylinder in method (1) above, a bullet-shaped or spherical runner may be caused to run along the inner circumferential surface of the cylinder. Thereafter, heat-drying is conducted. At this time, it is preferable to keep the cylinder vertical or horizontal in order to obtain a uniform film thickness. The above heat drying, which is effected in order to remove the water in the dispersion to form a fluoroplastic tubular outer layer on the inner circumferential surface of the cylinder, is conducted after void formation due to water evaporation and effects of residual moisture on the phenomenon of whitening (blushing) during or after the coating of a poly(amic acid) solution, reaction inhibition during imidization, the adhesion between the fluoroplastic and polyimide after imidization, etc. are taken in account when determining the temperature conditions etc. If required, the temperature may be regulated at 100° C. or more in order to completely evaporate the water. Thus, a fluoroplastic coating film (outer layer) is obtained. Subsequently, a poly(amic acid) solution is coated on the inner circumferential surface of the fluoroplastic coating film obtained. In this case, either of the following routes may be selected; (1) the step of coating a poly(amic acid) solution is conducted after dry state, and (2) the step of coating a poly(amic acid) solution is conducted after drying and sintering. The coating of the poly(amic acid) solution is accomplished by a method in which the poly(amic acid) solution is fed to around one end of the cylinder and a bullet-shaped or spherical runner is caused to run along the inner circumferential surface of the cylinder by use of the same technique as any of those described above. Upon heating, the poly(amic acid) coated is imidized. This heating for imidization is performed first at a temperature of 80° to 180° C. for 20 to 60 minutes to remove the solvent and then at a temperature of 150° to 400° C. for 20 to 60 minutes. By such heating, the ring closure water etc. that generate during imidization are evaporated and, at the same time, the imidization is carried out completely. As a result, a composite tubular article of the present invention is formed in the cylinder, which composite tubular article consists of the fluoroplastic tubular outer layer and a polyimide-resin tubular inner layer formed over the inner circumferential surface of the tubular outer layer.

It is preferable that in order to improve the interlaminar bonding strength between the inner layer and the outer layer in this invention, the inner circumferential surface of the fluoroplastic layer be treated with a sodium complex salt. By this treatment, a composite tubular article which does not suffer interlaminar peeling and has excellent durability is obtained. It is also preferable that in the composite tubular article obtained as described above, the thickness of the polyimide layer be in the range of from 10 to 150 $\mu$m and the thickness of the fluoroplastic layer be in the range of from 1 to 20 $\mu$m. Further, the surface roughness ($R_z$) of the fluoroplastic layer depends on the surface roughness of the inner circumferential surface of the cylinder used or on the average particle diameter of the particulate material dispersed, and is regulated in the range of from 1 to 10 $\mu$m.

In the second method, the composite tubular article is produced, for example, as follows by using the above-described fluoroplastic and poly(amic acid) solution in organic polar solvent. That is, the poly(amic acid) solution is first coated on the inner circumferential surface of a cylinder. As coating techniques, there may be mentioned two methods; (1) a method in which the cylinder as described above is coated by immersing it in the poly(amic acid) solution and then drawing it up, and (2) a method in which the poly(amic acid) solution is fed to around one end of the cylinder and a bullet-shaped or spherical runner is caused to run along the inner circumferential surface of the cylinder. From the two methods, proper one is suitably selected according to the situation etc. As the material of the above runner and as techniques for causing the runner to run, the same materials and methods as described above may be mentioned. According to need, after the poly(amic acid) solution is coated on the inner circumferential surface of the cylinder in method (1) above, a bullet-shaped or spherical runner may be caused to run along the inner circumferential surface of the cylinder. Thereafter, the poly(amic acid) coated is imidized upon heating. This heating for imidization is performed first at a temperature of 80° to 180° C. for 20 to 60 minutes to remove the solvent and then at a temperature of 250° to 400° C. for 20 to 60 minutes. By such heating, the ring closure water etc. that generate during imidization are evaporated and, at the same time, the imidization is carried out completely. Thus, a polyimide-resin tubular inner layer is obtained. In this case, it is preferable that the polyimide-resin tubular inner layer be formed so as to have a thickness in the range of from 10 to 150 $\mu$m. Subsequently, the polyimide tubular inner layer is taken out of the cylinder, and is immersed in a fluoroplastic solution in which 0.5 to 50 wt. % (based on the fluoroplastic solid matter) of a particulate material having an average particle diameter of 5 $\mu$m or less has been uniformly dispersed, thereby to coat the fluoroplastic solution on the outer circumferential surface of the polyimide tubular article. Thereafter, heating is conducted at a temperature of 80° to 180° C. for 10 to 30 minutes to remove the solvent and then sintering is performed at a temperature of 250° to 450° C. for 1 to 60 minutes. By such a method, a fluoroplastic tubular outer layer is obtained which has a uniformly roughened outer surface and has a thickness of 1 to 10 $\mu$m and a surface roughness ($R_z$) of 1 to 10 $\mu$m. The above surface roughness ($R_z$) is determined by measuring the surface roughness ($R_z$) at ten points on the surface of the fluoroplastic tubular article obtained and averaging the measured values. Incidentally, although the above immersion in the fluoroplastic solution results in adhesion of the fluoroplastic solution onto the inner circumferential surface of the polyimide tubular article, the adhered fluoroplastic solution may be wiped away with a cloth, etc.

In the third method, a polyimide-resin tubular inner layer having a thickness of 10 to 150 $\mu$m is formed on the inner circumferential surface of a cylinder by conducting the same procedures as in the second method described above, thereafter the tubular inner layer formed is taken out of the cylinder, and then the fluoroplastic solution (described hereinabove) in which a particulate material having an average particle diameter of 5 μm or less has been uniformly dispersed is uniformly spray-coated on the outer circumferential surface of the polyimide-resin tubular inner layer. Subsequently, sintering is conducted at a temperature of 350° to 450° C. for 1 to 60 minutes, thereby to obtain a composite tubular article of this invention which has a fluoroplastic outer layer having a thickness of 1 to 20 μm and a surface roughness ($R_z$) of 1 to 10 μm. The spray gun for use in the spray coating is not particularly limited, but a smaller nozzle diameter is preferred in order to attain uniform coating and 0.1 to 2 mm in diameter nozzle is normally employed. Further, too low a spray pressure is not preferred because drying is slow and cracks and pinholes are apt to generate, while too high a spray pressure is also not preferred because clogging is apt to occur at the nozzle tip. Normally, the spray pressure is in the range of from 1.0 to 5.0 kg/cm².

In order to improve the interlaminar bonding strength between the inner layer and the outer layer in the above-described second method and third method, it is preferable that the outer circumferential surface of the polyimide-resin inner layer be treated before the outer layer is formed. As the treating method, there may be mentioned wet treatments such as alkali treatment, primer treatment, ultrasonic treatment and etching treatment, and dry treatments such as corona treatment, plasma treatment, UV (ultraviolet) treatment, electron ray treatment and laser treatment. These treatments are used alone or in combination. Of the treatments mentioned above, alkali treatment, primer treatment, corona treatment, plasma treatment and UV treatment are preferably used from the standpoint of working properties.

Figure 1:
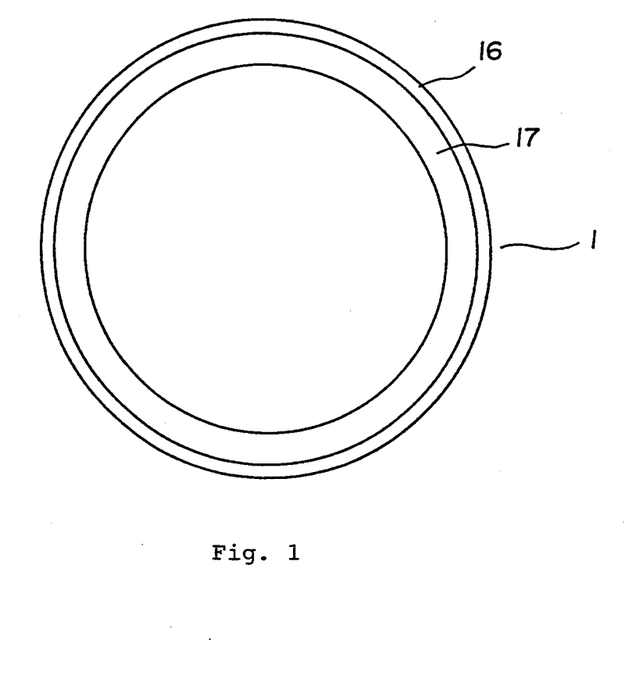
FIG. 1 is a cross-sectional view of a composite tubular article of this invention.

The composite tubular article obtained by such a method as those described above normally consists, as shown in FIG. 1, of a polyimide layer 17 as the inner layer and a fluoroplastic layer 16 as the outer layer. However, the composite tubular article of this invention is not limited to those having a two-layer structure consisting of a fluoroplastic layer and polyimide layer as described above, and may have a multilayer structure such as, for example, a three-layer or four-layer structure etc. formed by superposing resin layers.

Since the thus-obtained composite tubular article of this invention has been formed so that each layer has a uniform thickness in the specified range and the fluoroplastic layer has a uniformly roughened surface, it is extremely useful as a fixing belt etc. for forming matt images.

Figure 2:
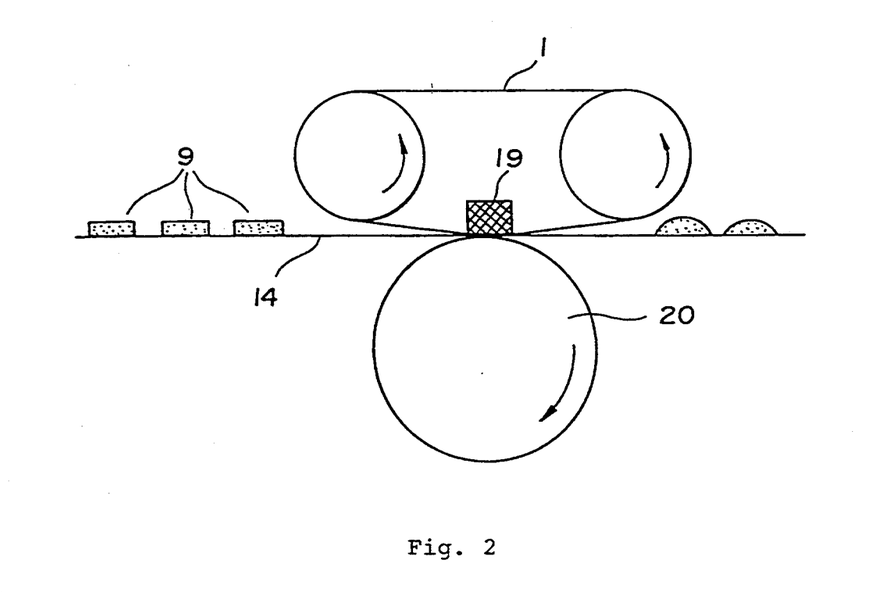
FIG. 2 is a diagrammatic view of the fixing mechanism part of an image-forming device employing the composite tubular article of this invention as an endless belt.

In this connection, an application example employing the composite tubular article of this invention is shown in FIG. 2. The figure is a diagrammatic view of the fixing mechanism part of an image-forming device employing the composite tubular article as an endless belt 1. A transfer paper 14 having a heat-sensitive ink 9 in an incompletely fixed state is inserted between a fixing heater 19 and a press roller 20, and the heat-sensitive ink 9 is fixed to the transfer paper 14 by heating and pressing. After the fixing, the transfer paper 14 easily peels off the endless belt 1 due to the release properties (offset properties) of the endless belt 1, and is then discharged. As a result, the image formed on the transfer paper 14 is a clear matt image having excellent quality.

1 . . . endless belt, 16 . . . fluoroplastic layer, 17 . . . polyimide layer.

BEST MODES FOR CARRYING OUT THE INVENTION

Examples of the present invention are given below to explain the invention in greater detail.

EXAMPLE 1

Approximately equimolar amounts of 3,3',4,4'-biphenyltetracarboxylic dianhydride and p-phenylenediamine were dissolved in N-methyl-2-pyrrolidone (hereinafter abbreviated as NMP; monomer concentration 20 wt. %) and allowed to react at a temperature of 20° C. for 5 hours, thereby preparing a poly(amic acid) solution having a rotational viscosity of 35,000 poises (as measured with a B-type viscometer) and a logarithmic viscosity of 2.8. Subsequently, this solution was diluted by adding 33 parts by weight of NMP to 100 parts by weight of the solution, and the resulting solution was further heated to 50° C. to give a poly(amic acid) solution having a viscosity of 1,500 poises.

Separately, a stainless-steel cylinder which had an inner diameter of 50 mm, a wall thickness of 5 mm, and a length of 500 mm and in which the inner circumferential surface had been roughened to have a surface roughness ($R_z$) of 2 μm was immersed in an electrically conductive fluoroplastic solution prepared by mixing a fluoroplastic dispersion (TE-334J; manufactured by Du Pont Inc.; solid concentration 60 wt. %) and a carbon black dispersion (solid concentration 16.5 wt. %; average particle diameter 0.35 μm; 5 wt. % based on the solid content of the fluoroplastic), and then drawn up at a speed of 30 mm/min. Subsequently, the resulting cylinder was heated and dried at 100° C. for 60 minutes and then at 400° C. for 5 minutes, thereby forming a fluoroplastic tubular article on the inner circumferential surface of the cylinder.

Next, the stainless-steel cylinder on which the fluoroplastic tubular article had been formed was immersed in the above-described poly(amic acid) solution, thereby applying the poly(amic acid) solution. The cylinder was then drawn up. Thereafter, a bullet-shaped runner having an outer diameter of 49.2 mm was caused to run in the cylinder at a speed of 50 mm/min by the gravity running method to thereby coat the poly(amic acid) solution on the inside of the fluoroplastic tubular article. After the coating, the resulting cylinder was heated at a temperature of 70° C. for 60 minutes, subsequently the temperature was raised from 70° C. to 300° C. at a rate of 0.8° C./min, and then heating was further continued at 300° C. for 60 minutes to remove the solvent and ring closure water and to carry out imidization. Thereafter, the resulting cylinder was cooled to room temperature to obtain a two-layer composite tubular article. This composite tubular article was then peeled from the stainless-steel cylinder and taken out. Both edges of the composite tubular article were cut off to give a length of 450 mm. Thus, a polyimide composite tubular article was obtained which had an outer diameter of 50 mm and a length of 450 mm and had an electrically conductive fluoroplastic layer on the outer circumferential surface. The above composite tubular article had a total wall thickness of 40 $\mu$m, of which the polyimide layer thickness was 30 $\mu$m and the fluoroplastic layer thickness was 10 $\mu$m, and had a surface roughness ($R_z$) of 1.8 $\mu$m and a surface resistance of $4 \times 10^4$ $\Omega/\square$.

This composite tubular article was free of coating unevenness and almost uniform in the thickness of each layer, and the uniform roughness of the inner circumferential surface of the cylinder had been transferred to the outer circumferential surface of the composite tubular article. This composite tubular article was used as the fixing belt (endless belt) 1 in an ink-regenerating type thermal transfer printer such as that shown in FIG. 3. As a result, a fixing system was obtained in which the fixing belt was good in the property of releasing the paper to which a heat-sensitive ink 9 had been fixed (the fixing belt was good in so-called offset properties). The image thus obtained had a uniform, matt surface.

Figure 3:
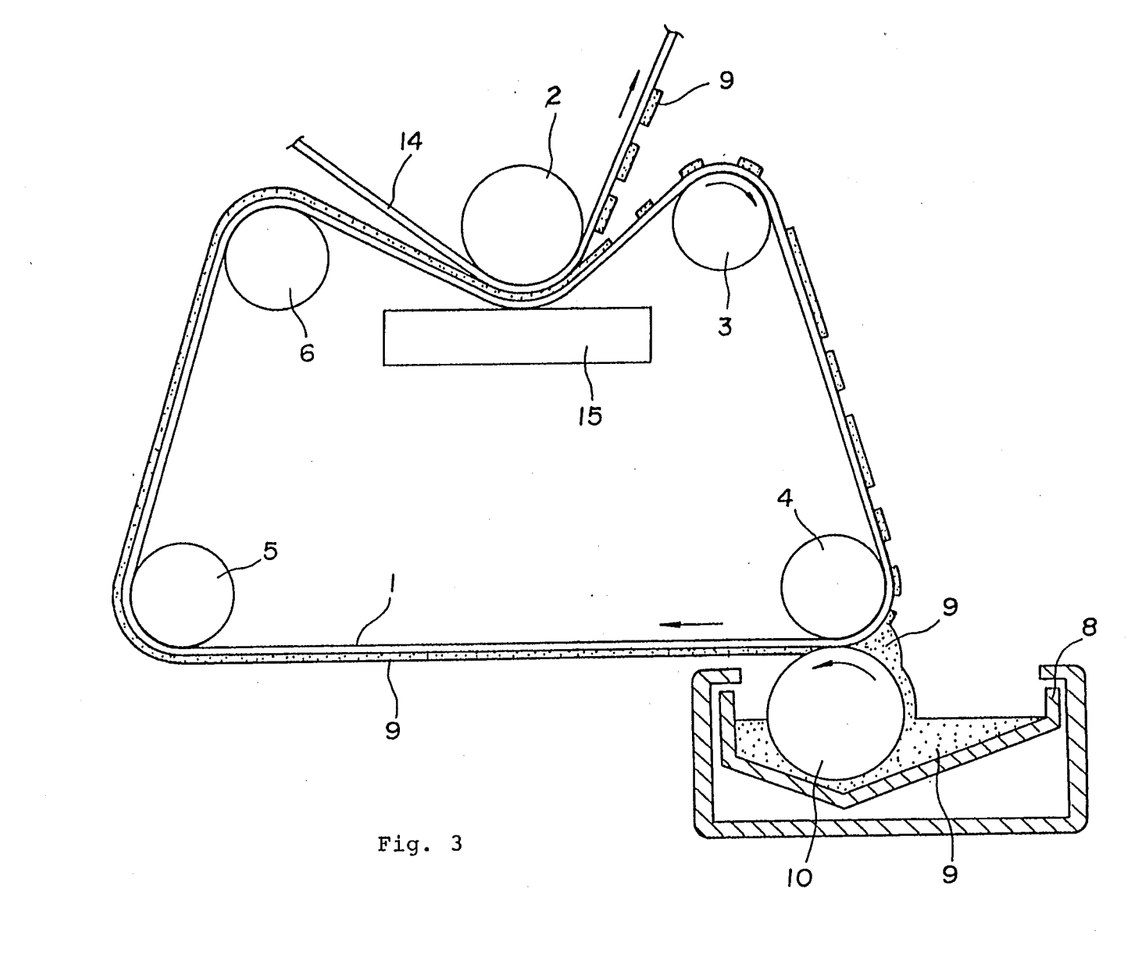
FIG. 3 is a diagrammatic view illustrating use of an ink-regenerating type thermal transfer printer employing the composite tubular article of this invention as a fixing belt.

In FIG. 3, numeral 2 denotes a platen roller, 3 a driving roller, 4 a back-up roller, 5, 6, and 10 rollers, 8 an ink tank, 9 a heat-sensitive ink, 11 an ink tank cover, and 15 a heater.

EXAMPLE 2

Approximately equimolar amounts of pyromellitic dianhydride and 4,4'-diaminodiphenyl ether were dissolved in NMP (monomer concentration 20 wt. %) and allowed to react at a temperature of 20° C. for 5 hours, thereby preparing a poly(amic acid) solution having a rotational viscosity of 28,000 poises and a logarithmic viscosity of 2.4. This solution was then heated to 50° C. to adjust its rotational viscosity to 1,500 poises.

A composite tubular article having an outer diameter of 50 mm and a length of 450 mm was obtained in the same manner as in Example 1 except that the poly(amic acid) solution obtained above was used. The thus-obtained composite tubular article had a total wall thickness of 40 $\mu$m, of which the polyimide layer thickness was 30 $\mu$m and the electrically conductive fluoroplastic layer thickness was 10 $\mu$m. The composite tubular article was free of coating unevenness and almost uniform in the thickness of each layer, and had a surface roughness ($R_z$) of 1.9 $\mu$m and a surface resistance of $5 \times 10^4$ $\Omega/\square$.

In the same manner as in Example 1, the above composite tubular article was used as the fixing belt in an ink-regenerating type thermal transfer printer shown in FIG. 3. As a result, the same results as in Example 1 were obtained and the image obtained had a uniform, matt surface.

EXAMPLE 3

Approximately equimolar amounts of 3,3',4,4'-biphenyltetracarboxylic dianhydride and 4,4'-diaminodiphenyl ether were dissolved in NMP (monomer concentration 20 wt. %) and allowed to react at a temperature of 20° C. for 5 hours, thereby preparing a poly(amic acid) solution having a rotational viscosity of 25,000 poises and a logarithmic viscosity of 2.3. This solution was then heated to 50° C. to adjust its rotational viscosity to 1,500 poises.

A composite tubular article having an outer diameter of 50 mm and a length of 450 mm was obtained in the same manner as in Example 1 except that the poly(amic acid) solution obtained above was used. The thus-obtained composite tubular article had a total wall thickness of 40 $\mu$m, of which the polyimide layer thickness was 30 $\mu$m and the electrically conductive fluoroplastic layer thickness was 10 $\mu$m. The composite tubular article was free of coating unevenness and almost uniform in the thickness of each layer, and had a surface roughness ($R_z$) of 1.8 $\mu$m and a surface resistance of $3 \times 10^4$ $\Omega/\square$.

In the same manner as in Example 1, the above composite tubular article was used as the fixing belt in an ink-regenerating type thermal transfer printer shown in FIG. 3. As a result, the same results as in Example 1 were obtained and the image obtained had a uniform, matt surface.

EXAMPLE 4

A glass tube which had an inner diameter of 123 mm, a wall thickness of 3 mm, and a length of 500 mm and in which the inner circumferential surface was smooth was immersed in the poly(amic acid) solution prepared in Example 1, thereby applying the poly(amic acid) solution on the inner circumferential surface of the tube. The tube was then drawn up.

Thereafter, a bullet-shaped runner having an outer diameter of 122.6 mm was caused to run in the above glass tube at a speed of 50 mm/min by means of gravity running to thereby uniformly coat the poly(amic acid) solution on the inner circumferential surface of the glass tube. After the coating, the coating was dried at a temperature of 70° C. for 60 minutes, subsequently the temperature was raised from 70° C. to 300° C. at a rate of 0.8° C./min, and then heating was further continued at 300° C. for 60 minutes to remove the solvent, ring closure water, etc. and to carry out imidization. The resulting tube was then cooled to room temperature to obtain a polyimide tubular article.

Subsequently, both end openings of the glass tube were plugged, and air was sent with application of pressure from a small through-hole provided beforehand around an opening of the glass tube, thereby peeling the formed polyimide tubular article from the glass tube. The peeled polyimide tubular article was drawn and taken out. This polyimide tubular article had an outer diameter of 123 mm, a wall thickness of 16 $\mu$m, and a length of 450 mm.

The above polyimide tubular article was then immersed in the electrically conductive fluoroplastic solution as used in Example 1, and drawn up at a speed of 100 mm/min. Thereafter, the resulting tubular article was air-dried for 10 minutes and then dried at a temperature of 100° C. for 10 minutes, and the electrically conductive fluoroplastic solution that had adhered to the inner circumferential surface of the polyimide tubular article was wiped away with a waste wetted with water.

This tubular article was then heated at a temperature of 400° C. for 5 minutes, thereby obtaining a composite tubular article having an electrically conductive fluoroplastic layer on the outer circumferential surface. The above composite tubular article had a total wall thickness of 24 $\mu$m, of which the thickness of the electrically conductive fluoroplastic layer was 8 $\mu$m, and had a uniformly roughened surface, with the surface roughness ($R_z$) being 1.2 μm, and a surface resistance of $5 \times 10^4$ Ω/□.

This composite tubular article was free of coating unevenness and almost uniform in the thickness of each layer. Further, in the same manner as in Example 1, the above composite tubular article was used as the fixing belt (endless belt) in an ink-regenerating type thermal transfer printer shown in FIG. 3. As a result, it showed good offset properties and the image obtained had good matt quality.

EXAMPLE 5

A composite tubular article was obtained in the same manner as in Example 4 except that 5% by weight (based on the solid content of the fluoroplastic) of silicone resin spherical particles (manufactured by Toshiba Silicone Co., Ltd.; Tospearl 120; average particle diameter 2.05 μm) were used in place of the carbon black dispersion used in Example 4 and that the poly(amic acid) prepared in Example 3 was used. The above composite tubular article had a total wall thickness of 23 μm, with the thickness of the fluoroplastic layer as the outer layer being 7 μm, and had a surface roughness ($R_z$) of 1.5 μm and a surface resistance of $1.0 \times 10^{12}$ Ω/□ or more.

In the same manner as in Example 1, the above composite tubular article was used as the fixing belt (endless belt) in an ink-regenerating type thermal transfer printer shown in FIG. 3. As a result, it showed good offset properties and the image obtained had good matt quality.

EXAMPLE 6

A composite tubular article free of coating unevenness was obtained in the same manner as in Example 5 except that benzoguanamine resin spherical particles (manufactured by Nippon Shokubai Kagaku Kogyo Co., Ltd.; Epostar M30; average particle diameter 3.25 μm) were used in place of the silicone resin spherical particles used in Example 5. The above composite tubular article had a total wall thickness of 23 μm, with the thickness of the fluoroplastic layer as the outer layer being 7 μm, and had a surface roughness ($R_z$) of 2.1 μm and a surface resistance of $1.0 \times 10^5$ Ω/□.

In the same manner as in Example 1, the above composite tubular article was used as the fixing belt (endless belt) in an ink-regenerating type thermal transfer printer shown in FIG. 3. As a result, it showed good offset properties and the image obtained had good matt quality.

EXAMPLE 7

A composite tubular article free of coating unevenness was obtained in the same manner as in Example 4 except that the poly(amic acid) prepared in Example 3 was used.

This composite tubular article had a total wall thickness of 24 μm, with the thickness of the electrically conductive fluoroplastic layer as the outer layer being 8 μm, and had a surface roughness ($R_z$) of 1.4 μm and a surface resistance of $7 \times 10^4$ Ω/□.

In the same manner as in Example 1, the above composite tubular article was used as the fixing belt (endless belt) in an ink-regenerating type thermal transfer printer shown in FIG. 3. As a result, it showed good offset properties and the image obtained had good matt quality.

EXAMPLE 8

A stainless-steel cylinder which had an inner diameter of 50 mm, a wall thickness of 5 mm, and a length of 500 mm and in which the inner circumferential surface was of smooth finish was immersed in the poly(amic acid) solution prepared in Example 2, thereby applying the poly(amic acid) solution on the inner circumferential surface of the cylinder. The cylinder was then drawn up.

Thereafter, a bullet-shaped runner having an outer diameter of 49.4 mm was caused to run in the above glass tube at a speed of 50 mm/min by means of gravity running to thereby uniformly coat the poly(amic acid) solution on the inner circumferential surface of the cylinder. After the coating, the coating was dried at a temperature of 70° C. for 60 minutes, the temperature was raised from 70° C. to 300° C. at a rate of 0.8° C./min, and then heating was further continued at 300° C. for 60 minutes to remove the solvent, ring closure water, etc. and to carry out imidization. The resulting cylinder was cooled to room temperature to obtain a polyimide tubular article.

Subsequently, both end openings of the cylinder were plugged, and air was sent with application of pressure from a small through-hole provided beforehand around an opening of the cylinder, thereby peeling the obtained polyimide tubular article from the glass tube. The peeled polyimide tubular article was drawn and taken out. This polyimide tubular article had an outer diameter of 50 mm, a wall thickness of 30 μm, and a length of 450 mm. On the outside of this tubular article, the fluoroplastic solution used in Example 1 was spray-coated by means of an air spray gun. Thereafter, the resulting tubular article was air-dried for 10 minutes and heated at 100° C. for 10 minutes and then at 400° C. for 5 minutes, thereby obtaining a composite tubular article having an electrically conductive fluoroplastic layer on the outer circumferential surface and free of coating unevenness. In the spray coating, the predetermined film thickness was obtained by repeating spraying 5 times, with the discharge amount being regulated so as to be small and the air pressure being regulated at 2 kg/cm² or more. (If the total thickness is formed by one time spraying, unevenness in film thickness results because of insufficient drying.)

This composite tubular article had a total wall thickness of 38 μm, with the thickness of the electrically conductive fluoroplastic layer as the outer layer being 8 μm, and had a surface roughness ($R_z$) of 3.3 μm and a surface resistance of $3 \times 10^4$ Ω/□.

Further, this composite tubular article was used as the fixing belt (endless belt) 1 in an image-forming device such as that shown in FIG. 2. As a result, the fixing system showed good offset properties after fixing of a heat-sensitive ink 9, and the image obtained had good matt quality.

EXAMPLE 9

A composite tubular article having an electrically conductive fluoroplastic layer on the outer circumferential surface and free of coating unevenness was obtained in the same manner as in Example 8 except that the poly(amic acid) prepared in Example 1 was used.

This composite tubular article had a total wall thickness of 37 μm, with the thickness of the electrically conductive fluoroplastic layer as the outer layer being 7

μm, and had a surface roughness ($R_z$) of 4.1 μm and a surface resistance of $1 \times 10^4$ Ω/□.

In the same manner as in Example 8, this composite tubular article was used as the fixing belt (endless belt) in an image-forming device such as that shown in FIG. 2. As a result, the fixing system showed good offset properties after fixing of a heat-sensitive ink, and the image obtained had good matt quality.

EXAMPLE 10

A stainless-steel cylinder which had an inner diameter of 50 mm and a length of 500 mm and in which the inner circumferential surface had been roughened to have a surface roughness ($R_z$) of 2 μm was immersed in the fluoroplastic solution prepared in Example 1, and drawn up at a speed of 30 mm/min. Subsequently, the resulting cylinder was heated at a temperature of 100° C. for 60 minutes and further heated at 400° C. for 5 minutes, thereby forming an electrically conductive fluoroplastic tubular article.

Next, the cylinder on which the above electrically conductive fluoroplastic layer had been formed was immersed for 1 minute in a sodium complex salt solution having a composition consisting of 23 g of metallic sodium, 128 g of naphthalene, and 1,000 ml of tetrahydrofuran, and then subjected to washing with acetone, washing with water, and drying.

The resulting cylinder was then immersed in the poly(amic acid) solution prepared in Example 1, thereby applying the poly(amic acid) solution on the inner circumferential surface of the cylinder. The cylinder was then drawn up. Thereafter, a bullet-shaped runner having an outer diameter of 49.2mm was caused to run in the cylinder at a speed of 50 mm/min by the gravity running method to thereby uniformly coat the poly(amic acid) solution on the inside of the fluoroplastic tubular article. After the coating, the resulting cylinder was heated at a temperature of 70° C. for 60 minutes, subsequently the temperature was raised from 70° C. to 300° C. at a rate of 0.8° C./min, and then heating was further continued at 300° C. for 60 minutes to remove the solvent and ring closure water and to carry out imidization. The resulting cylinder was cooled to room temperature to obtain a composite tubular article free of coating unevenness. This composite tubular article was peeled from the cylinder and taken out. Both edges of the composite tubular article were cut off to give a length of 450mm. Thus, a polyimide tubular article was obtained which had an outer diameter of 50 mm and a length of 450 mm and had an electrically conductive fluoroplastic layer on the outer circumferential surface. The above composite tubular article had a total wall thickness of 40 μm, a polyimide layer thickness of 30 μm, an electrically conductive fluoroplastic layer thickness of 10 μm, a surface roughness ($R_z$) of 1.9 μm, and a surface resistance of $5 \times 10^4$ Ω/□.

This composite tubular article had extremely tenacious interlaminar bonding strength. It was used as the fixing belt (endless belt) in an image-forming device such as that shown in FIG. 2. As a result, it showed good offset properties and a matt image was obtained. Further, in a continuous paper feeding test, the fixing belt showed excellent durability exceeding 100,000 sheets.

EXAMPLE 11

A glass tube which had an inner diameter of 123 mm, a wall thickness of 3 mm, and a length of 500 mm and in which the inner circumferential surface was smooth was used as the cylinder and immersed in the poly(amic acid) solution prepared in Example 3, thereby applying the poly(amic acid) solution on the inner circumferential surface of the cylinder. The cylinder was then drawn up. Thereafter, a bullet-shaped runner having an outer diameter of 122.6 mm was caused to run in the cylinder at a speed of 50 mm/min by the gravity running method to thereby uniformly coat the poly(amic acid) solution on the inner circumferential surface of the cylinder. After the coating, the coating was dried at a temperature of 70° C. for 60 minutes, subsequently the temperature was raised from 70° C. to 300° C. at a rate of 0.8° C./min, and then heating was further continued at 300° C. for 60 minutes to remove the solvent and ring closure water and to carry out imidization. The resulting cylinder was then cooled to room temperature to obtain a polyimide tubular article.

Subsequently, both end openings of the cylinder were plugged, and air was sent with application of pressure from a small through-hole provided beforehand around an opening of the cylinder, thereby peeling the polyimide tubular article from the cylinder. The peeled polyimide tubular article was taken out. Both edges of the tubular article were cut off to give a tubular article having an outer diameter of 123 mm, a length of 450 mm, and a wall thickness of 16 μm.

The outer circumferential surface of the thus-obtained polyimide tubular article was subjected for 1 minute to corona treatment using a roller electrode at an output of 100 W.

The thus-treated polyimide tubular article was immersed in the electrically conductive fluoroplastic solution prepared in Example 1, and drawn up at a speed of 100 mm/min. The resulting tubular article in which the outer circumferential surface had been coated with the fluoroplastic solution was air-dried for 10 minutes and then dried at a temperature of 100° C. for 10 minutes, and the fluoroplastic solution that had adhered to the inner circumferential surface was wiped away with a waste wetted with water. Thereafter, this tubular article was heated at a temperature of 400° C. for 5 minutes, thereby obtaining a composite tubular article having an electrically conductive fluoroplastic layer on the outer circumferential surface and free of coating unevenness. This composite tubular article had a total wall thickness of 24 μm, of which the thickness of the electrically conductive fluoroplastic layer was 8 μm, and had a surface roughness ($R_z$) of 1.6 μm and a surface resistance of $6 \times 10^4$ Ω/□.

This composite tubular article had extremely tenacious interlaminar bonding strength, and showed durability exceeding 50,000 sheets in a continuous paper feeding test on an image-forming device such as that shown in FIG. 2. Further, the composite tubular article was used as the fixing belt (endless belt) in an ink-regenerating type thermal transfer printer such as that shown in FIG. 3 and, as a result, it showed good offset properties and a matt image was obtained.

EXAMPLE 12

A stainless-steel cylinder which had an inner diameter of 50 mm, a wall thickness of 5 mm, and a length of 500 mm and in which the inner circumferential surface was of smooth finish was immersed in the poly(amic acid) solution prepared in Example 2, thereby applying the poly(amic acid) solution on the inner circumferential surface of the cylinder. The cylinder was then drawn up. Thereafter, a bullet-shaped runner having an outer diameter of 49.4 mm was caused to run in the cylinder at a speed of 50 mm/min by the gravity running method to thereby uniformly coat the poly(amic acid) solution on the inner circumferential surface of the cylinder. After the coating, the coating was dried at a temperature of 70° C. for 60 minutes, subsequently the temperature was raised from 70° C. to 300° C. at a rate of 0.8° C./min, and then heating was further continued at 300° C. for 60 minutes to remove the solvent and ring closure water and to carry out imidization. The resulting cylinder was cooled to room temperature to obtain a polyimide tubular article.

Subsequently, both end openings of the cylinder were plugged, and air was sent with application of pressure from a small through-hole provided beforehand around an opening of the cylinder, thereby peeling the polyimide tubular article from the cylinder. The peeled polyimide tubular article was taken out. Both edges of the tubular article were cut off to give a tubular article having an outer diameter of 50 mm, a length of 450 mm, and a wall thickness of 30 $\mu$m.

The outer circumferential surface of the thus-obtained polyimide tubular article was subjected to alkali treatment by immersing the tubular article in a 2N-sodium hydroxide solution for 10 minutes, followed by washing with water, washing with acetone, and air drying.

The thus-treated polyimide tubular article was spray-coated in the same manner as in Example 8, thereby obtaining a composite tubular article having an electrically conductive fluoroplastic layer on the outer circumferential surface and free of coating unevenness. This composite tubular article had a total wall thickness of 38 $\mu$m, of which the thickness of the electrically conductive fluoroplastic layer was 8 $\mu$m, and had a surface roughness ($R_z$) of 3.5 $\mu$m and a surface resistance of $2 \times 10^4$ $\Omega/\square$.

This composite tubular article had extremely tenacious interlaminar bonding strength. It was used as the fixing belt (endless belt) in an image-forming device such as that shown in FIG. 2 and, as a result, it showed durability exceeding 100,000 sheets in a continuous paper feeding test. Further, the fixing belt showed good offset properties and a matt image was obtained.

EXAMPLE 13

A stainless-steel cylinder which had an inner diameter of 50 mm, a wall thickness of 5 mm, and a length of 500 mm and in which the inner circumferential surface was of smooth finish was immersed in the poly(amic acid) solution prepared in Example 1, thereby applying the poly(amic acid) solution on the inner circumferential surface of the cylinder. The cylinder was then drawn up. Thereafter, a bullet-shaped runner having an outer diameter of 49.4 mm was caused to run in the cylinder at a speed of 50 mm/min by the gravity running method to thereby uniformly coat the poly(amic acid) solution on the inner circumferential surface of the cylinder. After the coating, the coating was dried at a temperature of 70° C. for 60 minutes, subsequently the temperature was raised from 70° C. to 300° C. at a rate of 0.8° C./min, and then heating was further continued at 300° C. for 60 minutes to remove the solvent and ring closure water and to carry out imidization. The resulting cylinder was cooled to room temperature to obtain a polyimide tubular article.

Subsequently, both end openings of the cylinder were plugged, and air was sent with application of pressure from a small through-hole provided beforehand around an opening of the cylinder, thereby peeling the polyimide tubular article from the cylinder. The peeled polyimide tubular article was taken out. Both edges of the tubular article were cut off to give a tubular article having an outer diameter of 50 mm, a length of 450 mm, and a wall thickness of 30 $\mu$m.

The outer circumferential surface of the thus-obtained polyimide tubular article was uniformly spray-coated with a fluoroplastic-based primer, air-dried for 10 minutes, and then dried at 100° C. for 30 minutes, thereby forming a primer layer on the outer circumferential surface.

The thus-treated polyimide tubular article was spray-coated in the same manner as in Example 8, thereby obtaining a composite tubular article having an electrically conductive fluoroplastic layer on the outer circumferential surface and free of coating unevenness. This composite tubular article had a total wall thickness of 40 $\mu$m, of which the thickness of the electrically conductive fluoroplastic layer was 10 $\mu$m, and had a surface roughness ($R_z$) of 3.9 $\mu$m and a surface resistance of $2 \times 10^4$ $\Omega/\square$.

This composite tubular article had extremely tenacious interlaminar bonding strength. It was used as the fixing belt (endless belt) in an image-forming device such as that shown in FIG. 2 and, as a result, it showed durability exceeding 100,000 sheets in a continuous paper feeding test. Further, the fixing belt showed good offset properties and a matt image was obtained.

COMPARATIVE EXAMPLE 1

A composite tubular article was obtained in the same manner as in Example 1 except that the cylinder used was a stainless-steel cylinder (having the same dimensions) in which the inner circumferential surface was of smooth finish. This tubular article was free of coating unevenness and had a total wall thickness of 37 $\mu$m, an electrically conductive fluoroplastic layer thickness of 7 $\mu$m, a surface roughness ($R_z$) of 0.2 $\mu$m, and a surface resistance of $2 \times 10^4$ $\Omega/\square$. This tubular article was used as the fixing belt in an ink-regenerating type thermal transfer printer shown in FIG. 3 and, as a result, it showed good offset properties but the surface of the image obtained was glossy.

COMPARATIVE EXAMPLE 2

A composite tubular article having a fluoroplastic layer on the outer circumferential surface was obtained in the same manner as in Example 4 except that the fluoroplastic solution used did not contain the carbon black dispersion and consisted of the fluoroplastic dispersion only. This tubular article was free of coating unevenness and had a total wall thickness of 22 $\mu$m, a fluoroplastic layer thickness of 6 $\mu$m, a surface roughness ($R_z$) of 0.3 $\mu$m, and a surface resistance of $1 \times 10^{12}$ $\Omega/\square$ or more. This tubular article was used as the fixing belt in an ink-regenerating type thermal transfer printer shown in FIG. 3 and, as a result, it showed good offset properties but the surface of the image obtained was glossy.

COMPARATIVE EXAMPLE 3

A composite tubular article having a fluoroplastic layer on the outer circumferential surface was obtained in the same manner as in Example 9 except that the fluoroplastic solution used did not contain the carbon black dispersion and consisted of the fluoroplastic dispersion only. This tubular article was free of coating unevenness and had a total wall thickness of 36 μm, a fluoroplastic layer thickness of 6 μm, a surface roughness ($R_z$) of 0.4 μm, and a surface resistance of $1 \times 10^{12}$ Ω/□ or more. This tubular article was used as the fixing belt in an image-forming device shown in FIG. 2 and, as a result, it showed good offset properties but the surface of the image obtained was glossy.

POSSIBILITY OF INDUSTRIAL APPLICATION

As described above, in the present invention, the composite tubular article is produced by coating a fluoroplastic solution on the inner circumferential surface of a cylinder to form a fluoroplastic tubular outer layer, further coating a poly(amic acid) solution on the inner circumferential surface of the tubular outer layer, and causing a bullet-shaped or spherical runner to run along the surface on which the poly(amic acid) solution has been coated, or the composite tubular article is produced by coating a poly(amic acid) solution on the inner circumferential surface of a cylinder, causing a bullet-shaped or spherical runner to run along the surface on which the poly(amic acid) solution has been coated, thereby to form a polyimide-resin tubular inner layer, taking the polyimide-resin tubular inner layer out of the cylinder, and coating a fluoroplastic solution in which a particulate material having an average particle diameter of 5 μm or less has been uniformly dispersed on the outer circumferential surface of the polyimide-resin tubular inner layer by dip coating or spray coating. Due to such production processes, unevenness of the coating of the solutions is not caused and, further, each layer in the thus-obtained composite tubular article is formed so as to have a thickness in the specific range without causing unevenness in thickness. Moreover, since a cylinder is used, good circumferential length accuracy is obtained and, at the same time, the fluoroplastic outer layer formed has an extremely uniform surface. Such a composite tubular article can be formed in an endless form, and is advantageously used as the belt in a thermal transfer printer, the conveyor or fixing belt in a copying machine, facsimile, printer, etc., a conveyor belt for silicon wafers, etc.

Furthermore, since antistatic effect is imparted to the fluoroplastic outer layer by dispersing an electrically conductive particulate material in the outer layer, the composite tubular article, when used as a fixing belt, exhibits an excellent effect, with adhesion of dust, foreign particles, etc. being prevented.

We claim:

1. A composite tubular article for a fixing belt comprising a tubular inner layer made of a polyimide resin and a tubular outer layer made of a fluoroplastic, characterized by that the outer circumferential surface of said fluoroplastic tubular outer layer has a surface roughness ($R_z$) of 1 to 10 μm.

2. A composite tubular article for a fixing belt as claimed in claim 1, wherein the outer circumferential surface of the fluoroplastic tubular outer layer has a pure water contact angle of 90 degrees or more.

3. A composite tubular article for a fixing belt as claimed in claim 1, wherein the fluoroplastic tubular outer layer contains a particulate material having an average particle diameter of 5 μm or less.

4. A composite tubular article for a fixing belt as claimed in claim 3, wherein the particulate material is an electrically conductive particulate material.

5. A composite tubular article for a fixing belt as claimed in any one of claims 1 to 3, wherein the inner circumferential surface of the fluoroplastic tubular outer layer has been treated with a sodium complex salt.

6. A composite tubular article for a fixing belt as claimed in any one of claims 1 to 3, wherein the outer circumferential surface of the polyimide-resin tubular inner layer has undergone at least one treatment selected from alkali treatment, primer treatment, corona treatment, plasma treatment, and UV treatment.

7. A process for producing a composite tubular article for a fixing belt characterized by coating a fluoroplastic solution on the inner circumferential surface of a cylinder to form a tubular outer layer made of the fluoroplastic, said inner circumferential surface having a surface roughness ($R_z$) of 1 to 10 μm, further coating a poly(amic acid) solution on the inner circumferential surface of the thus-formed fluoroplastic tubular outer layer, causing a bullet-shaped or spherical runner to run along the inner circumferential surface on which the poly(amic acid) solution has been coated, subsequently imidizing the poly(amic acid) to form a tubular inner layer made of a polyimide resin, thereby to obtain a composite tubular article, and then taking the composite tubular article out of the cylinder.

8. A process for producing a composite tubular article for a fixing belt as claimed in claim 7, wherein the fluoroplastic solution contains a particulate material having an average particle diameter of 5 μm or less uniformly dispersed therein.

9. A process for producing a composite tubular article for a fixing belt as claimed in claim 7, wherein the inner circumferential surface of the formed fluoroplastic tubular outer layer is treated by bringing a sodium complex salt into contact with the inner circumferential surface, and thereafter the polyimide-resin tubular inner layer is formed.

10. A process for producing a composite tubular article for a fixing belt characterized by coating a poly(amic acid) solution on the inner circumferential surface of a cylinder, causing a bullet-shaped or spherical runner to run along the inner circumferential surface on which the poly(amic acid) solution has been coated, subsequently imidizing the poly(amic acid) to form a tubular inner layer made of a polyimide resin, thereafter taking the polyimide-resin tubular inner layer out of the cylinder, and then immersing the tubular inner layer in a fluoroplastic solution in which a particulate material having an average particle diameter of 5 μm or less has been uniformly dispersed, thereby to form a tubular outer layer made of the fluoroplastic on the outer circumferential surface of the polyimide-resin tubular inner layer.

11. A process for producing a composite tubular article for a fixing belt characterized by coating a poly(amic acid) solution on the inner circumferential surface of a cylinder, causing a bullet-shaped or spherical runner to run along the inner circumferential surface on which the poly(amic acid) solution has been coated, subsequently imidizing the poly(amic acid) to form a tubular inner layer made of a polyimide resin, thereafter taking the polyimide-resin tubular inner layer out of the cylinder, and then spray-coating the outer circumferential surface of the tubular inner layer with a fluoroplastic solution in which a particulate material having an average particle diameter of 5 μm or less has been uniformly dispersed, thereby to form a tubular outer layer made of the fluoroplastic.

12. A process for producing a composite tubular article for a fixing belt as claimed in any one of claims 7, 10, and 11, wherein the particulate material is an electrically conductive particulate material.

13. A process for producing a composite tubular article for a fixing belt as claimed in claim 10 or 11, wherein the outer circumferential surface of the formed polyimide-resin tubular inner layer is subjected to at least one treatment selected from alkali treatment, primer treatment, corona treatment, plasma treatment, and UV treatment, and thereafter the fluoroplastic tubular outer layer is formed.

* * * * *